United States Patent [19]
Shibata et al.

[11] Patent Number: 5,155,696
[45] Date of Patent: Oct. 13, 1992

[54] POSITION DETECTING APPARATUS

[75] Inventors: Shinji Shibata; Yasukazu Hayashi, both of Ooguchi, Japan

[73] Assignee: Kabushiki Kaisha Okuma Tekkosho, Aichi, Japan

[21] Appl. No.: 510,689

[22] Filed: Apr. 18, 1990

[30] Foreign Application Priority Data

Apr. 25, 1989 [JP] Japan .................................. 1-105616

[51] Int. Cl.⁵ ............................................. G06F 15/20
[52] U.S. Cl. ................................................. 364/571.01
[58] Field of Search ...................... 364/449, 454, 571.01

[56] References Cited

U.S. PATENT DOCUMENTS

Re. 33,025  8/1989  Matsumoto et al. ................. 364/444
4,343,035  8/1982  Tanner ............................ 364/450 X Primary Examiner—Parshotam S. Lall
Assistant Examiner—Edward R. Cosimano
Attorney, Agent, or Firm—Wenderoth, Lind & Ponack

[57] ABSTRACT

In a position detecting apparatus, digital signals in the presence of excitation signals are corrected by digital signals in the absence of excitation signals which are off-set values generated by each components of this postiion detecting apparatus. It therefore eliminates troublesome adjustment by variable resistors, and achieves precise position detection at any time without errors. Furthermore, since signals in the direction opposite to exciting signals are applied to the resolver upon the completion of excitation, the output of the resolver quickly becomes stable in the non-excited state, and off-set values are measured at a high speed.

2 Claims, 4 Drawing Sheets

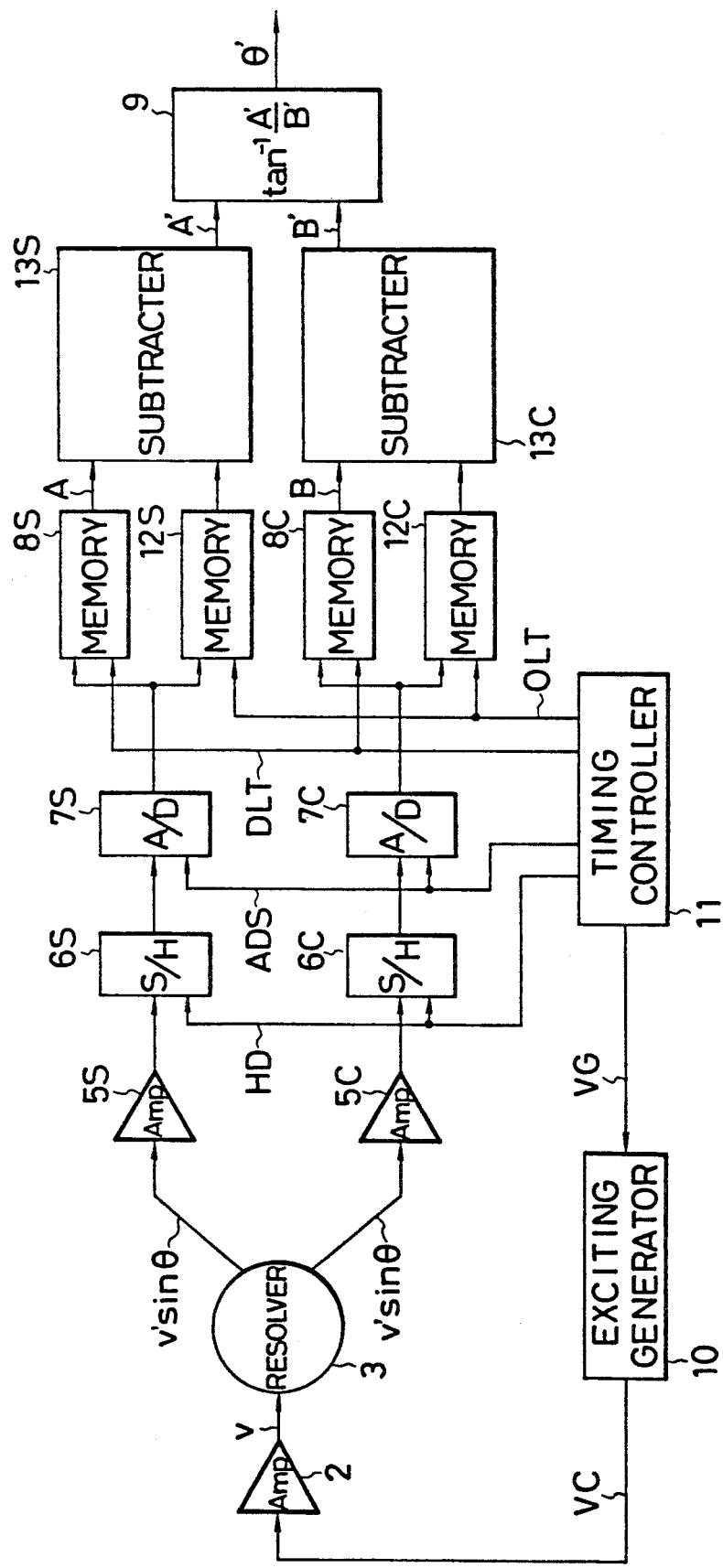
F I G. 3

5,155,696

POSITION DETECTING APPARATUS

BACKGROUND OF THE INVENTION

The present invention relates to a position detecting apparatus used for detecting a rotational position of a machine shaft.

FIG. 1 is a block diagram showing an embodiment of a prior art position detecting apparatus, and FIG. 2 is a time chart for a timing controller 1, which is an essential component of the apparatus of FIG. 1. An exciting signal VC is generated by an exciting generator 10 upon receipt of an exciting generation signal VG output by the timing controller 1 at a time point $t_1$, amplified by an amplifier 2 to become an exciting signal v for a resolver 3 and fed to the resolver 3. Analog signals v'. sin $\theta$ and v'. cos $\theta$ which serve as functions for an angle of deviation $\theta$ from a reference position are respectively output to amplifiers 5S and 5C from the resolver 3 by the exciting signal v and are amplified. The amplified analog signals v'. sin $\theta$ and v'. cos $\theta$ are respectively held by sample-and-hold circuits 6S and 6C in accordance with a hold signal HD output by the timing controller 1 at a time point $t_2$. The held analog signals v'. sin $\theta$ and v'. cos $\theta$ are respectively output to A/D converters 7S and 7C and are converted from analog to digital signals in accordance with an A/D signal ADS output by the timing controller 1 at a time point $t_3$. The converted digital signals A and B are respectively latched in memories 8S and 8C in accordance with a data latch signal DLT output by the timing controller 1 at a time point $t_4$. An arithmetic unit 9 calculates $\tan^{-1}(A/B)$ to output the deviation angle $\theta$.

Since errors are generally included in the deviation angle $\theta$ due to off-set values which are generated in the amplifiers 5S and 5C, the sample-and-hold circuits 6S and 6C and the A/D converters 7S and 7C, variable resistors 4S and 4C are provided in the amplifiers 5S and 5C and are ajusted so as to cancel the off-set values.

The above prior art position detecting apparatus cannot cope with changes in off-set values caused by changes in temperature and fails to detect the position with a high precision. Further, adjustment by variable resistors is too troublesome.

SUMMARY OF THE INVENTION

The present invention was contrived to solve the problem encountered in the prior art position detecting apparatus, and aims at providing a position detecting apparatus which achieves high precision position detection at any time with ease.

According to one aspect of the present invention, for achieving the objects described above, there is provided a position detecting apparatus which comprises a resolver, an exciting generation means for generation of excitation signals which excite said resolver, a conversion means which converts analog signals outputted from said resolver to digital signals, a first memory means which stores said digital signals in the presence of excitation signals, a second memory means which stores said digital signals in the absence of excitation signals and an arithmetic means which computes the rotational position of said resolver by subtracting the digital signals stored in the second memory means from the digital signals stored in the first memory means.

The nature, principle and utility of the invention will become more apparent from the following detailed description when read in conjunction with the accompanying drawings.

BRIEF DESCRIPTION OF THE DRAWINGS

In the accompanying drawings:
FIG. 3 is a block diagram showing an embodiment of a position detecting apparatus according to the present invention.

DESCRIPTION OF THE PREFERRED EMBODIMENT

Figure 1:
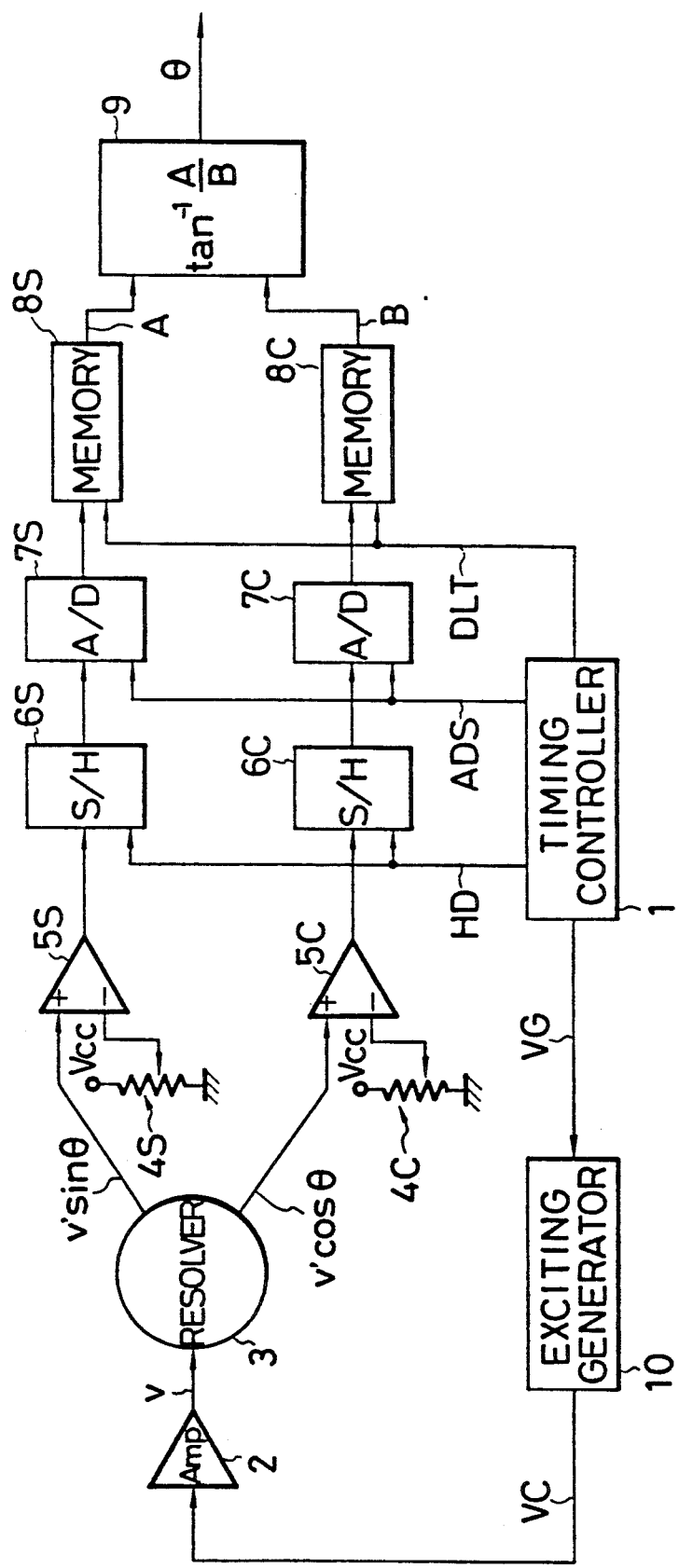
FIG. 1 is a block diagram showing an embodiment of a prior art position detecting apparatus.
Figure 2:
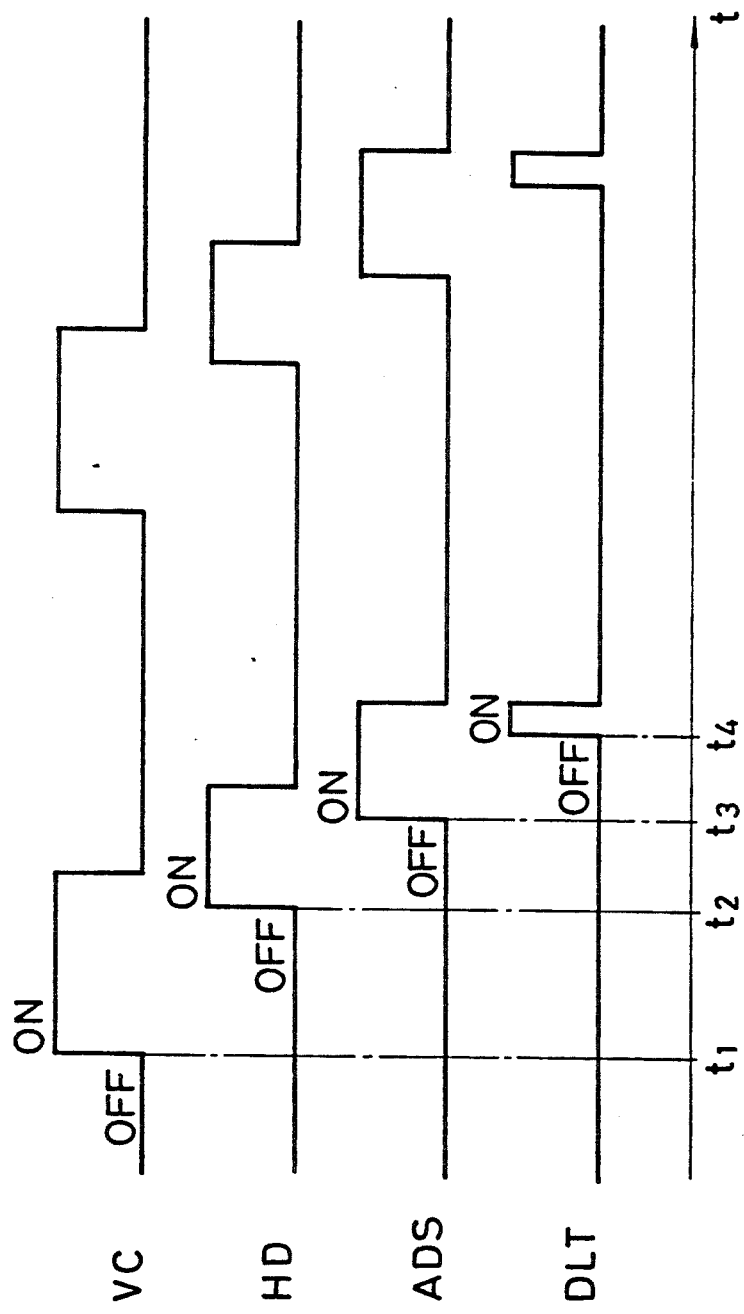
FIG. 2 is a time chart showing examples of the operation steps of the position detecting apparatus of FIG. 1.
Figure 4:
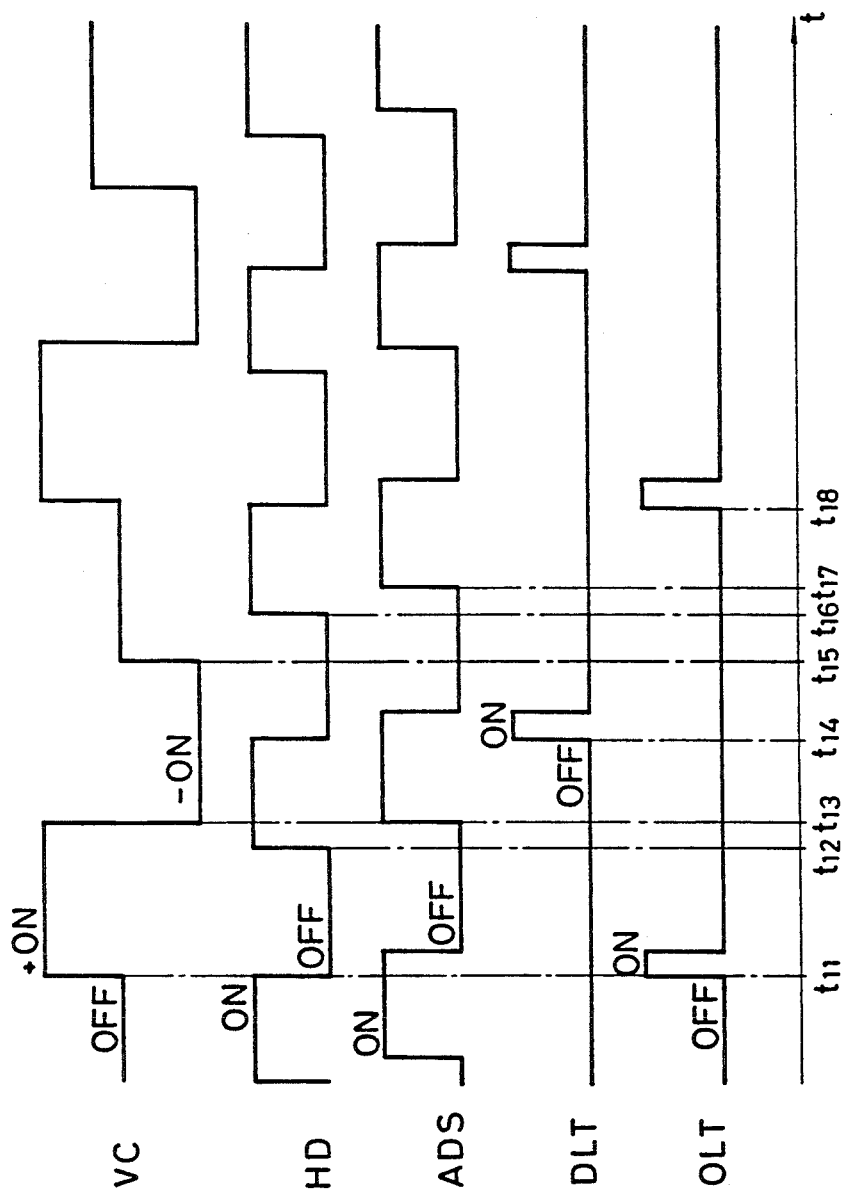
FIG. 4 is a time chart showing examples of the operation steps of the position detecting apparatus of FIG. 3.

FIG. 3 is a block diagram showing an embodiment of the present invention position detecting apparatus in correspondence with FIG. 1. The same components are denoted with the same numerals and letters. FIG. 4 is a time chart for a timing controller 11 which is a major component of the apparatus of FIG. 3.

An exciting signal VC on the positive side is generated by the exciting generator 10 upon receipt of an exciting generation signal VG for generation of excitation output, by the timing controller 11 at a time point $t_{11}$, amplified by the amplifier 2 to become an exciting signal v for the resolver 3 and output to the resolver 3. Analog signals v'. sin $\theta$ and v'. cos $\theta$ which serve as functions for an angle of deviation $\theta$ from the reference position are output to the amplifiers 5S and 5C respectively from the resolver 3 with the exciting signal V and are amplified. The amplified analog signals v'. sin $\theta$ and v'. cos $\theta$ are held by the sample-and-hold circuits 6S and 6C in accordance with a hold signal HD output by the timing controller 11 at a time point $t_{12}$. The held analog signals v'. sin $\theta$ and v'. cos $\theta$ are output to the A/D converters 7S and 7C respectively and are converted from analog to digital signals in accordance with an A/D signal ADS output by the timing controller 11 at a time point $t_{13}$. At the same time (at the time point $t_{13}$), the exciting signal VC on the negative side is generated by the exciting generator 10 upon receipt of the exciting generation signal VG output by the timing controller 11 and output to the resolver 3 via the amplifier 2.

On the other hand, digital signals A and B which were converted by the A/D converters 7S and 7C are latched by the memories 8S and 8C respectively with a data latch signal DLT output by the timing controller 11 at a a time point $t_{14}$. Subsequently, the resolver 3 is not excited at a time point $t_{15}$, and analog signals in the absence of excitation signals of the resolver 3 are held by the sample-and-hold circuits 6S and 6C in accordance with a hold signal HD output by the timing controller 11 at a time point $t_{16}$ when output of the resolver 3 has become sufficiently stable. The held analog signals of the resolver 3 in the absence of excitation signals are sent to the A/D converters 7S and 7C and are converted from analog to digital signals in accordance with an A/D signals ADS output by the timing controller 11 at a time point $t_{17}$. The converted digital signals of the resolver 3 in the absence of excitation signals are latched by memories 12S and 12C respectively in accordance with an off-set latch signal OLT output by the timing controller 11 at a time point $t_{18}$. The digital signals of the resolver in the absence of excitation 3 thus latched are off-set values which are generated in the amplifiers 5S and 5C, the sample-and-hold circuits 6S and 6C and the A/D converters 7S and 7C.

The differences A' and B' between the digital signals A and B output from the memories 8S and 8C and the digital signals of the resolver in the absence of excitation 3 from the memories 12S and 12C are calculated by subtracters 13S and 13C to cancel the off-set values, and $\tan^{-1}(A'/B')$ is computed by an arithmetic unit 9 to output the angle of deviation $\theta'$ without errors.

A part of the circuit of the above mentioned embodiment may be replaced by a microcomputer and software. The above off-set values may be filtered to obtain more reliable off-set values.

As has been described above, the present invention position detecting apparatus is capable of detecting a position without off-set value-induced errors. High precision machining can therefore be achieved by mounting this detecting apparatus, for instance, on a machine tool.

What is claimed is:

1. A position detecting apparatus comprising:

a resolver;

an exciting generation means for generating exciting signals for exciting said resolver, said exciting signals being generated in accordance with a first control signal input thereto, and for outputting signals which are opposite in electrical polarity to said exciting signals previously fed to said resolver after the cessation of said exciting signals being fed to said resolver;

a conversion means for converting analog signals outputted from said resolver into digital signals;

a first memory means for storing digital signals outputted from said conversion means in accordance with a second control signal;

a second memory means for storing digital signals outputted from said conversion means in accordance with a third control signal;

a control means for outputting said first control signal which alternately and repeatedly commands exciting terms and non-exciting terms to said exciting generation means, and for outputting said third control signal which stores said digital signals in said second memory in the absence of the generation of exciting signals and for outputting said second control signal which stores said digital signals in said first memory in the presence of the generation of said exciting signals;

a subtractor for subtracting said digital signals stored in said second memory means from said digital signals stored in said first memory means and for providing an output corresponding thereto; and an arithmetic means for computing a rotational position of said resolver on the basis of said output of said subtractor.

2. A position detecting apparatus as recited in claim 1, wherein said conversion means comprises a sample-and-hold means.

* * * * *